(12) United States Patent
Sang et al.

(10) Patent No.: US 6,741,589 B1
(45) Date of Patent: May 25, 2004

(54) APPARATUS AND METHOD FOR STORING DATA SEGMENTS IN A MULTIPLE NETWORK SWITCH SYSTEM USING A MEMORY POOL

(75) Inventors: Jinqlih (Charlie) Sang, Fremont, CA (US); Shashank Merchant, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/562,003

(22) Filed: May 2, 2000

Related U.S. Application Data
(60) Provisional application No. 60/177,346, filed on Jan. 24, 2000.

(51) Int. Cl.[7] .............................................. H04L 12/56
(52) U.S. Cl. ........................................ 370/386; 370/429
(58) Field of Search ................................ 370/386, 387, 370/388, 395.7, 395.71, 395.72, 412, 413, 415, 417, 428, 429, 474

(56) References Cited

U.S. PATENT DOCUMENTS

| | | | | |
|---|---|---|---|---|
| 6,021,128 A | * | 2/2000 | Hosoya et al. | 370/380 |
| 6,122,274 A | * | 9/2000 | Kumar | 370/388 |
| 6,160,809 A | * | 12/2000 | Adiletta et al. | 370/392 |

* cited by examiner

Primary Examiner—Kwang Bin Yao (57) ABSTRACT

Multiple network switch modules have memory interfaces configured for transferring packet data to respective local buffer memories via local memory controllers. The local memory controllers are connected to each other to form a signal memory pool for transfer among each other data units of data frames received from different network switch modules. Each of the controllers are also connected to a corresponding local buffer memory and either write received data units in the corresponding local buffer memory or transfer the received data units to other controllers that, in turn, write the data units in their corresponding local buffer memory. The local memory controllers transfer and write and read the data units according to a prescribed sequence, optimizing memory bandwidth by concurrently executing a prescribed number of successive memory writes or memory reads.

12 Claims, 6 Drawing Sheets

FIG. 7

APPARATUS AND METHOD FOR STORING DATA SEGMENTS IN A MULTIPLE NETWORK SWITCH SYSTEM USING A MEMORY POOL

RELATED APPLICATION

This application contains subject matter related to the subject matter disclosed in U.S. Provisional Patent Application Serial No. 60/177,346, filed on Jan. 24, 2000.

FIELD OF THE INVENTION

The present invention relates to computer network interfacing and switching, and more particularly, to an apparatus and method for connecting multiple multiport network switches to increase the number of ports in a network switching arrangement.

BACKGROUND ART

A multiport network switch in a packet switching network is coupled to stations on the network through its multiple ports. Data sent by one station on the network to one or more other stations on the network are sent through the network switch. The data is provided to the network switch over a shared access medium according to, for example, an Ethernet protocol (IEEE Std. 802.3) The network switch, which receives a data frame at one of its multiple ports, determines a destination network station for the data frame from information contained in the data frame header. Subsequently, the network switch transmits the data from the port or ports connected to the destination network station or stations.

A single Ethernet network switch may have a number of 10/100 Mb/s ports, equaling, for example, 12 ports. The number of end stations connected to the single network switch is limited by the number of ports (i.e., port density) of the network switch. However, users of networking devices demand flexibility and scalability in their networks. To address this need, modular architectures have been developed that enable cascading of identical networking devices or network switch modules. By cascading these devices (or components) in a loop, port density can be readily increased without redesign or development of costly interfaces.

Figure 1:
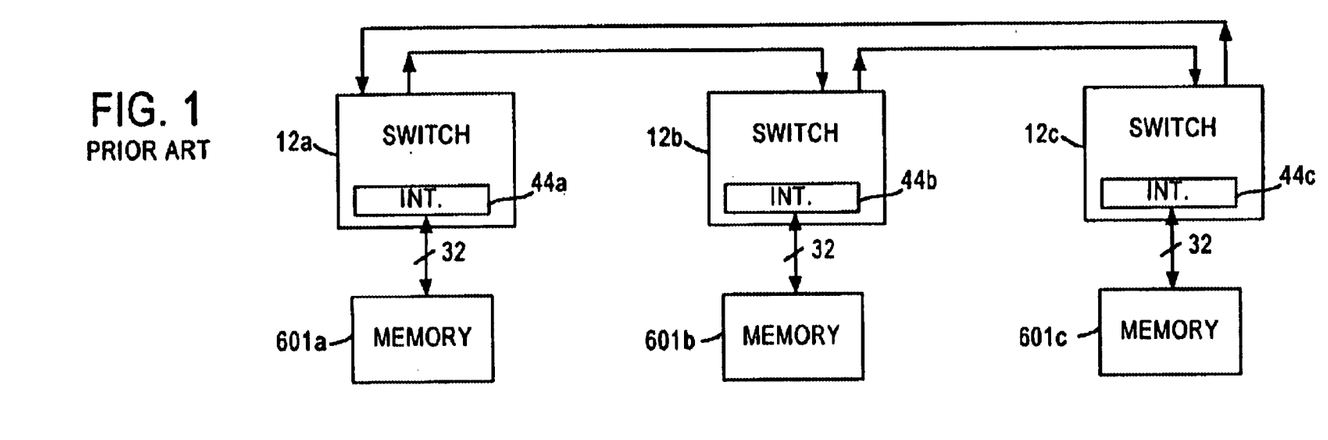
FIG. 1 is a block diagram illustrating a conventional switching arrangement that cascades multiple switch modules.

Unfortunately, as the number of cascaded switches increases, so does the system latency (i.e., the aggregate processing delay of the switches). System latency is attributable, in part, to the manner in which the switches store and retrieve the data frames in memory. One traditional memory architecture employs individual, local memories for each cascaded switch, as shown in FIG. 1. In this example, three multiport switches 12a, 12b, and 12c are cascaded together to permit the exchange of data frames received by any one of the switches and subsequent forwarding of the data frames out of a different multiport switch. Each of these switches 12a, 12b, and 12c has a memory interface, 44a, 44b, and 44c, respectively. These memory interfaces 44a, 44b, and 44c enable switches 12a, 12b, and 12c to access their respective memories 601a, 601b, and 601c to write and read the data frames.

For explanation purposes it is assumed that a data frame is received at a port (i.e., receive port) on switch 12a and that the data frame destination is a node attached to a port on a different switch 12c. Switch 12a first stores the received data frame in memory 601a, and then determines whether to forward the received data frame out of its own port or send it to the next switch in sequence. Because the data frame is not destined to any port of switch 12a, the data frame is retrieved from memory 601a and sent to the next switch 12b via the cascade port (i.e., the port to which the neighboring switches are connected) of switch 12a. Upon receiving the data frame, switch 12b stores the data frame in memory 601b. Switch 12b then examines the data frame and determines that it should be forwarded to switch 12c. Accordingly, switch 12b forwards the data frame to switch 12c by reading the stored received data frame from memory 601b and sending the data frame out its cascade port. When the data frame arrives at switch 12c, switch 12c writes the data frame into its memory 601c, in similar fashion as the other switches 12a and 12b. At this point, however, switch 12c determines that the data frame should be forwarded out one of its ports, which is connected to the destination node. Hence, switch 12c reads the stored data frame and forwards it out the appropriate port. As evident by this example, the data frame, as it is transferred from switch to switch is stored and read numerous times into the memories of the respective switches. The series of write and read operations disadvantageously imposes costly delay in the switching system.

Figure 2:
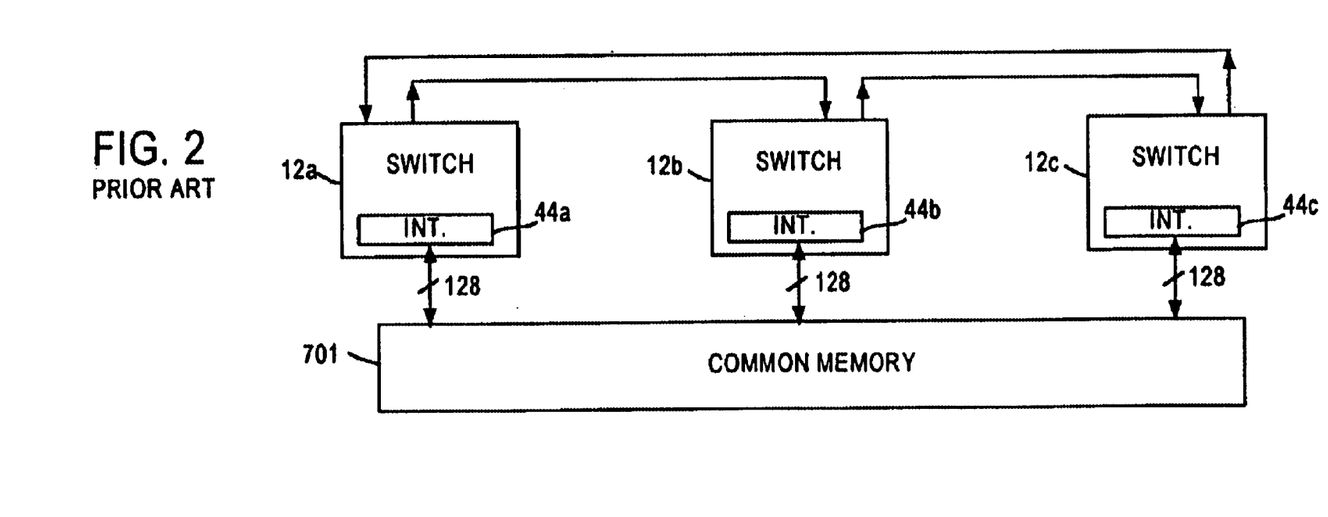
FIG. 2 is a diagram illustrating a alternative prior art arrangement using cascaded switching modules to store data frames in a common memory.

To address this latency problem, one conventional approach is to employ a common memory among the various switches. FIG. 2 illustrates such a system in which switches 12a, 12b, and 12c share memory 701 via memory interfaces 44a, 44b, and 44c, respectively. Under this approach, the interfaces 44a, 44b, and 44c are required to have a wider data bus to maintain the speed of read and write accesses as compared to the individual memory arrangement of FIG. 1. For example, the bus width of the memory interfaces 44a, 44b, and 44c may need to increase to 128 bits. The main drawback with this common memory implementation is that the increase in memory bandwidth also results in a proportionate increase in the pin count. An increase in the number of pins disadvantageously requires more area on the circuit board, resulting in greater package cost.

SUMMARY OF THE INVENTION

There is need for connecting multiple multiport switches to increase port density, while minimizing system latency. There is also a need to increase memory bandwidth of a multiple switch arrangement without increasing the number of pin counts.

These and other needs are obtained by the present invention, where a plurality of switch modules transfer frame data of a corresponding received frame as data units. Local memory controllers enable the transfer of data units between the multiport switch modules and a shared memory system, increasing the overall bandwidth between the memory system and the multiport switch module by the transfer of multiple data units for a given data packet to different memories.

One aspect of the present invention provides a switching system. The switching system includes a plurality of multiport switch modules, each having a memory interface configured for outputting frame data of a corresponding received data frame as data units onto a corresponding first data bus. The present invention also includes a plurality of local memory controllers, each local memory controller connected to a corresponding multiport switch module via the corresponding data bus and configured for routing data units over one of a second data bus connecting the local memory controller and a corresponding third data bus. A plurality of buffer memories is included, each buffer memory coupled to a corresponding one of the local memory controllers by the corresponding third data bus and configured for storing a data unit of each of the data frames from the multiport switch modules, each of the local memory controllers supplying the data units of the corresponding received data frame to the plurality of buffer memories according to a prescribed access protocol.

Since each of the multiport switch modules supply the data units of the corresponding received data frame to the plurality of buffer memories via interconnected memory controllers, each buffer memory may store frame data for different multiport switch modules. Moreover, the transfer of the data units according to prescribed access protocol enables concurrent access of all the buffer memories, enabling a higher overall effective memory bandwidth between the multiport switch modules and the plurality of buffer memories. One aspect of this invention includes receiving, routing and temporarily storing the data units in different local memory controllers and then storing the data units in the local buffer memories according to the prescribed access protocol. Hence, the memory bandwidth is substantially increased without increasing the pin count of the switch modules.

Another aspect of the present invention provides a method for temporarily storing data frames received from network node, the method comprising receiving the data frame via a first of a plurality of switches, each of the switches having a memory interface configured for transferring a data frame between the switch and a corresponding local memory controller, each corresponding local memory controller, in turn, connected to a corresponding local memory controller. At least a first portion of the data frame is then output to a first corresponding local buffer memory from a first corresponding local memory controller. At least a second portion of the data frame is transferred to at least one other of the plurality of local memory controllers from the first corresponding local memory controller and the second portion is output by the at least one other local memory controller to a second corresponding memory.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral represent like element throughout and wherein.

BEST MODE FOR CARRYING OUT THE INVENTION

Switch Architecture Overview

Figure 3:
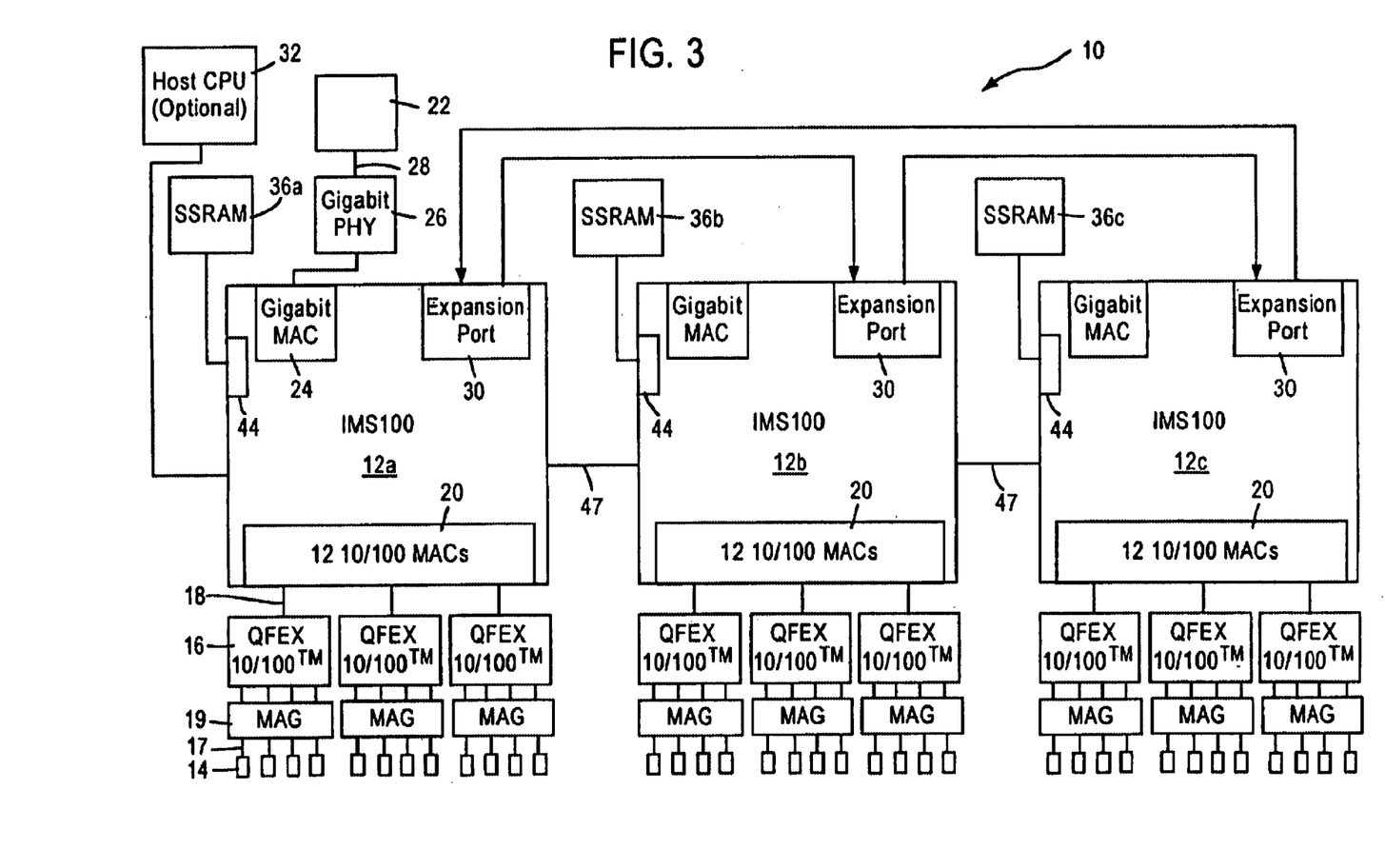
FIG. 3 is a diagram illustrating a switching system according to an embodiment of the present invention.

FIG. 3 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PRY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/EEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface device that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Pooled Memory System

The present invention is directed to a network switch arrangement that has the capability to provide high port densities while minimizing system latency. The buffer memories of multiple network switches are pooled together by local memory controllers to support high port requirements and to increase memory bandwidth. This architecture advantageously permits the sharing of memories across multiple switches without an increase in pin count.

Figure 4:
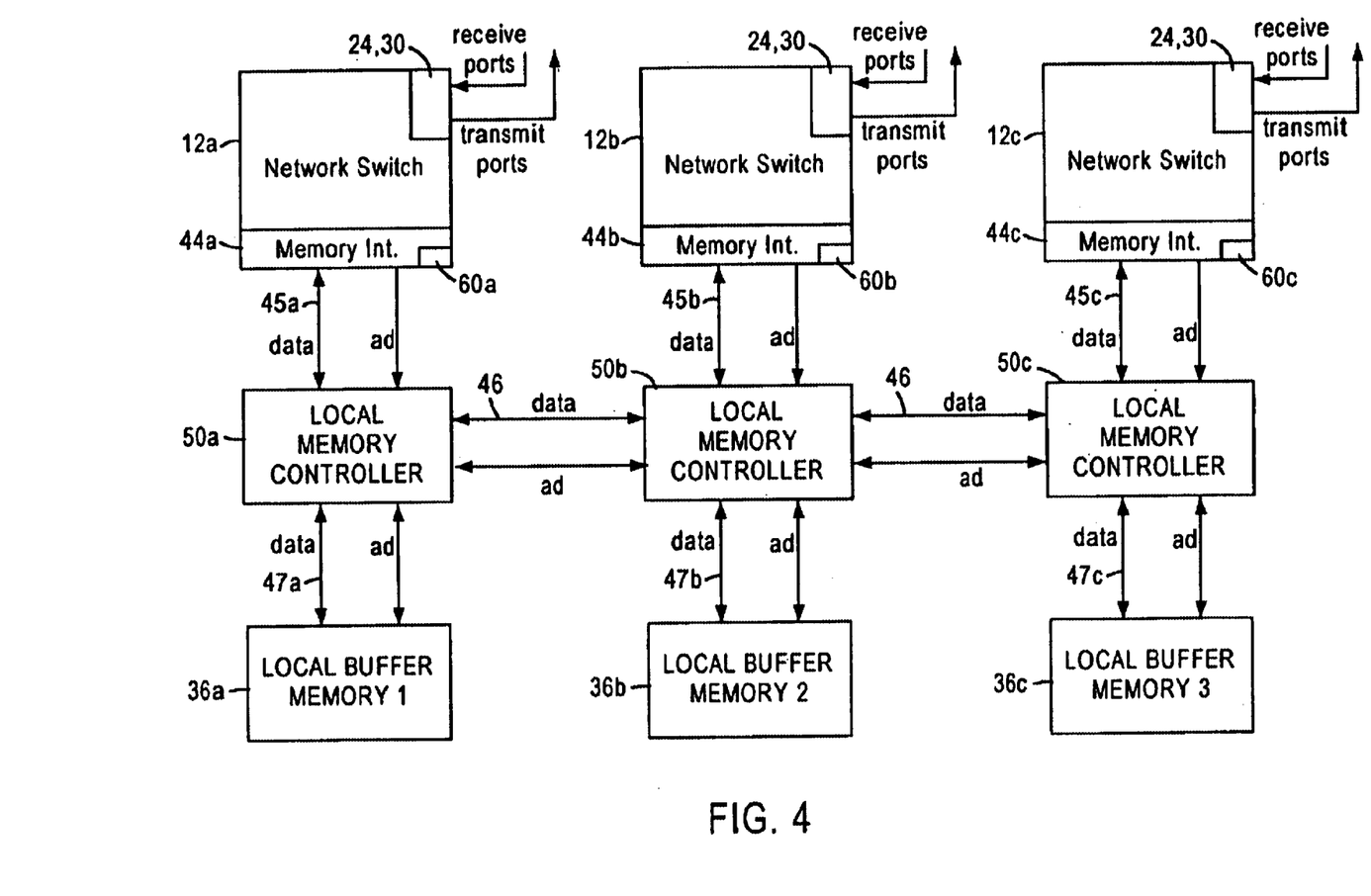
FIG. 4 is a block diagram in further detail the switching system of FIG. 3 including a single.

FIG. 4 is a block diagram of a switching system according to an embodiment of the present invention. As shown in FIG. 4, each multiport switch module 12 includes a memory interface 44 for segmenting and outputting data of a corresponding received data frame as one or more data units onto a data bus 45 having a prescribed bit width, for example 32 bits. As will be described below, the local buffer memories 36, which are preferably comprised of SSRAM memories, are configured for storing a data unit of data frames received from each of the multiport switch modules 12 via local memory controllers 50. For example, local buffer memory 36a is configured for receiving frame data as data units for data frames received by each of the switch modules 12a, 12b, and 12c and transferred to the local memories controllers 50a, 50b, and 50c. The local memory controllers 50 are connected to each other by a data bus 46 and perform routing of received data units to the local buffer memories 36. Hence, the interconnected local memory controllers 50 pool the local buffer memories as a signal memory pool.

Each memory interface 44 is configured for transferring each data unit of a data packet to the corresponding local memory controller 50. The local memory controller 50 is configured to either transfer the received data units to the corresponding local buffer memory 36, or to another one of the local memory controllers 50 for transfer to another buffer memory 36. For example, a first data unit of a data packet may be transferred by the memory interface 44a to local memory controller 50a for storage in local buffer memory 36a, although the next data unit for the same data packet may be transferred by the local memory controller 50a to local memory controller 50b for storage in local buffer memory 36b.

Figure 5:
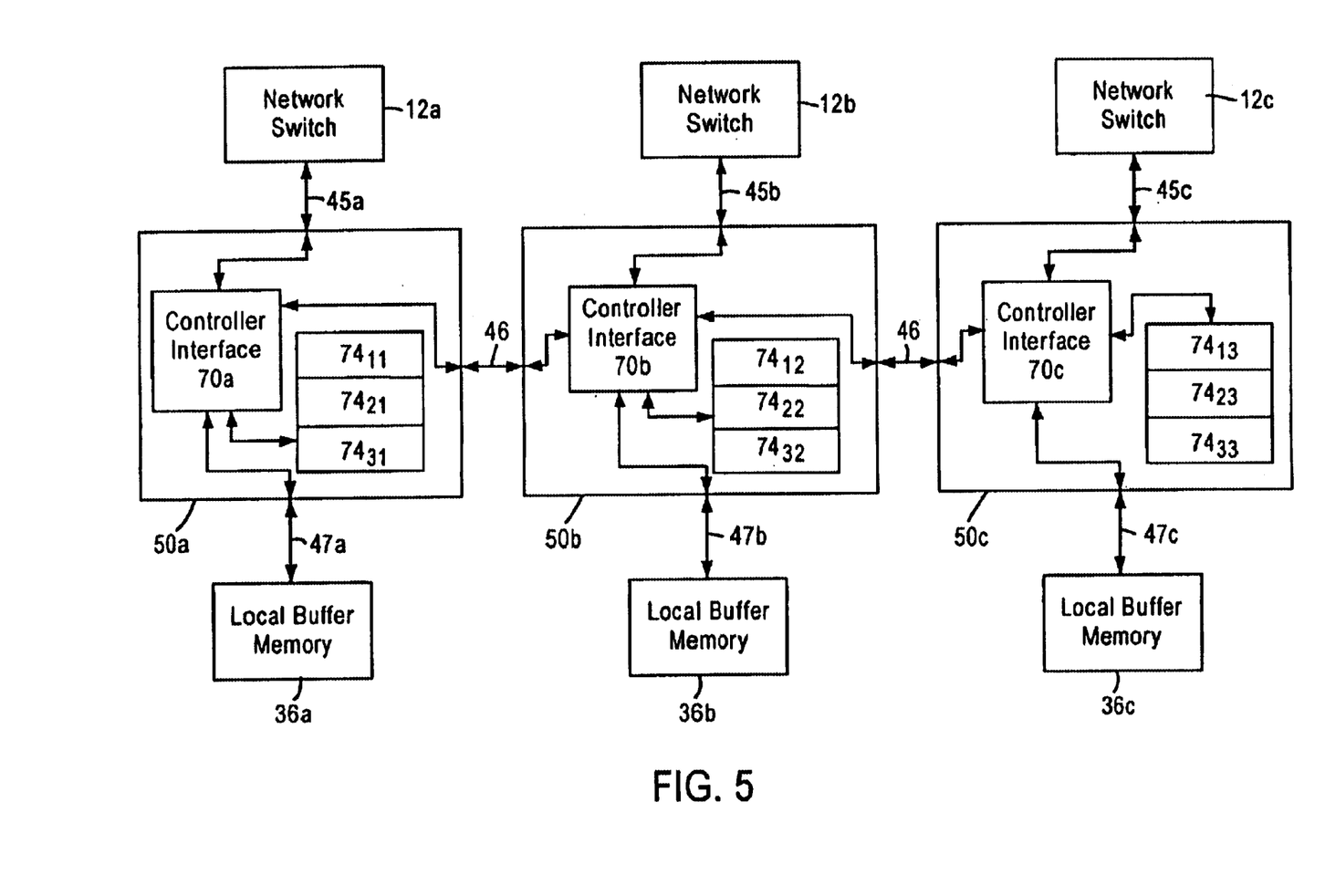
FIG. 5 is a block diagram illustrating the switching system including the distributed memory interface according to an alternative embodiment of the present invention.

A scheduler 60 within each memory interface 44 controls the writing and reading of data units between the plurality of buffer memories by the local memory controllers 50 according to a prescribed access protocol determined by the scheduler 60 and communicated to the local memory controllers, described in detail below with respect to FIGS. 5 and 6. In particular, each scheduler 60 determines whether a given data unit should be transferred to the corresponding memory 36, or should be transferred to another memory 36 via the local memory controllers 50, FIG. 5 illustrates in further detail the interconnected local memory controllers 50, which includes a controller interface 70 and a plurality of elasticity buffers 74. The controller interface 72 is configured for temporarily storing the data units in the elasticity buffers 74 during transfer of the data units between the multiport switch modules 12, the buffer memories 36 and other local memory controllers 50. The controller interface 70 transfers packet data for a given data frame each memory access cycle via the data bus 46 to other local buffer memory controllers 50 for storage of data units of a given data frame within two or more of the local buffer memories, effectively increasing the overall memory bandwidth to for the given data frame. As described below with respect to FIG. 6, the controller interfaces 70 control the temporary storage of data units in the elasticity buffers 74 and control writing and reading of data units in the local buffer memories 36 according to a prescribed access protocol.

Figure 6:
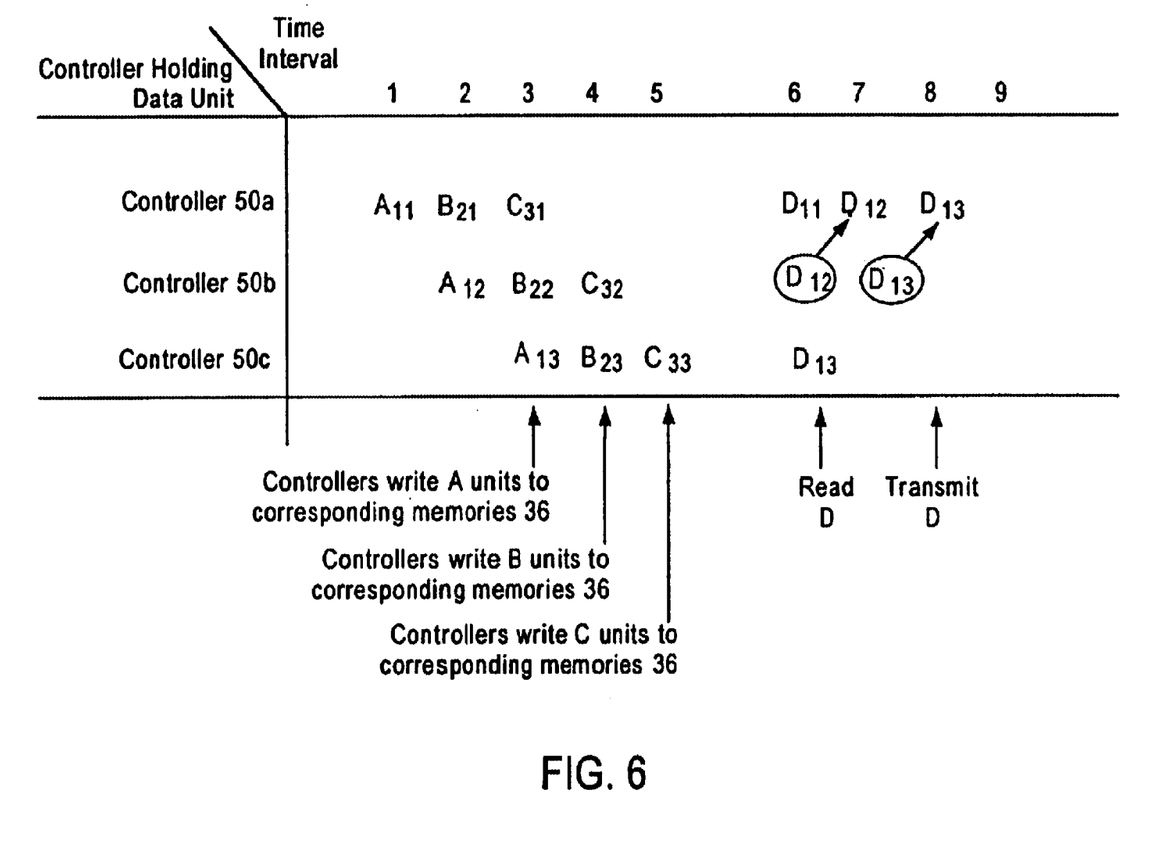
FIG. 6 is a diagram illustrating a prescribed memory access protocol used by the memory interfaces according to an embodiment of the present invention.

FIG. 6 is a diagram illustrating a prescribed access protocol for use by the controller interfaces 70 for transfer of frame data on a data unit basis according to an embodiment of the present invention. Assume in FIG. 6 that multiport switch modules 12a, 12b, and 12c receive data packets A, B, and C beginning at time intervals 1, 2, and 3, respectively. Each time interval FIG. 6 corresponds to a prescribed number of bit times (e.g., the amount of time necessary for a network switch module 12 to receive the prescribed number of bits of frame data from the network, such as 32 bits). As shown in FIG. 6, the switch module 12a begins receiving packet A during time interval 1. Assuming no latency issues, the memory interface 44a begins transfer of a 31-bit data unit All onto its corresponding data bus 45a. In the case of FIG. 4 the scheduler 60a controls the memory interface 44a to transfer the data unit $A_{11}$ to the local memory controller 50a. The controller interface 70a, as shown in FIG. 5, temporarily stores the frame data All in elasticity buffer $74_{11}$.

During the next time interval 2, the switch module 12a is receiving the second data unit of packet A while switch module 12b is receiving the first data unit of data packet B. As shown in FIG. 6, the prescribed protocols of FIGS. 4 and 5 cause the second data unit of packet A ($A_{12}$) to be transferred to controller interface 70a within local memory controller 50a. According to the prescribed access protocol, the controller interface 70a transfers the second data unit of packet A ($A_{12}$) to controller interface 70b within local memory controller 50b via data bus 46. The local memory controller 50b then temporarily stores the second data unit $A_{12}$ in elasticity buffer $74_{12}$ within local memory controller 50b shown in FIG. 5. At the same time, the first data unit $B_{21}$ received by switch module 12b is transferred by memory interface 44b in FIG. 4 to controller interface 70b shown in FIG. 5. The controller interface 70b transfers the data unit $B_{21}$ to controller interface 70a which, in turn, temporarily stores data unit $B_{21}$ in elasticity buffer $74_{21}$ during the same time interval 2.

During time interval 3, with reference to FIGS. 5 and 6, the first data unit of data packet C, received by switch module 12c ($C_{31}$) is transferred to controller 50c which, in turn, transfers the data packet to controller interface 70a via data bus 46 for temporary storage in elasticity buffer $74_{31}$. Meanwhile, the second data unit of data packet B ($B_{22}$) is temporarily stored in elasticity buffer $74_{22}$ within local memory controller 50b by controller interface 70b. Also, the third data unit of data packet A ($A_{13}$) is transferred by controller interface 70a to controller interface 70c for temporary storage in elasticity buffer $74_{13}$. At the end of time interval 3, the controllers 70a, 70b, and 70c write the data packet A units $A_{11}$, $A_{12}$ and $A_{13}$, into respective local buffer memories 36a, 36b and 36c from elasticity buffers $74_{11}$, $74_{12}$ and $74_{13}$. At time intervals 4 and 5, the data units of data packets B and C are also transferred to the local buffer memories 36, respectively, as shown in FIG. 6.

The schedulers 60 of FIG. 4 and controller interfaces 70 of FIG. 5 provide multiple concurrent transfers of data units to the buffer memories 36, maximizing the memory bandwidth between the memory interfaces 44 and the respective buffer memories 36. Since the greatest disruption to memory bandwidth is the requirement of a turnaround cycle between reads and writes on a memory data bus, the schedulers 60 control the memory interfaces 44 to successively write to the buffer memories 36 data units for a prescribed successive number of memory access cycles before switching to reading of data from the memories for another successive prescribed number of access cycles. Hence, the number of delays due to turnaround cycles on the data buses 45 and 47 are minimized.

Figure 7:
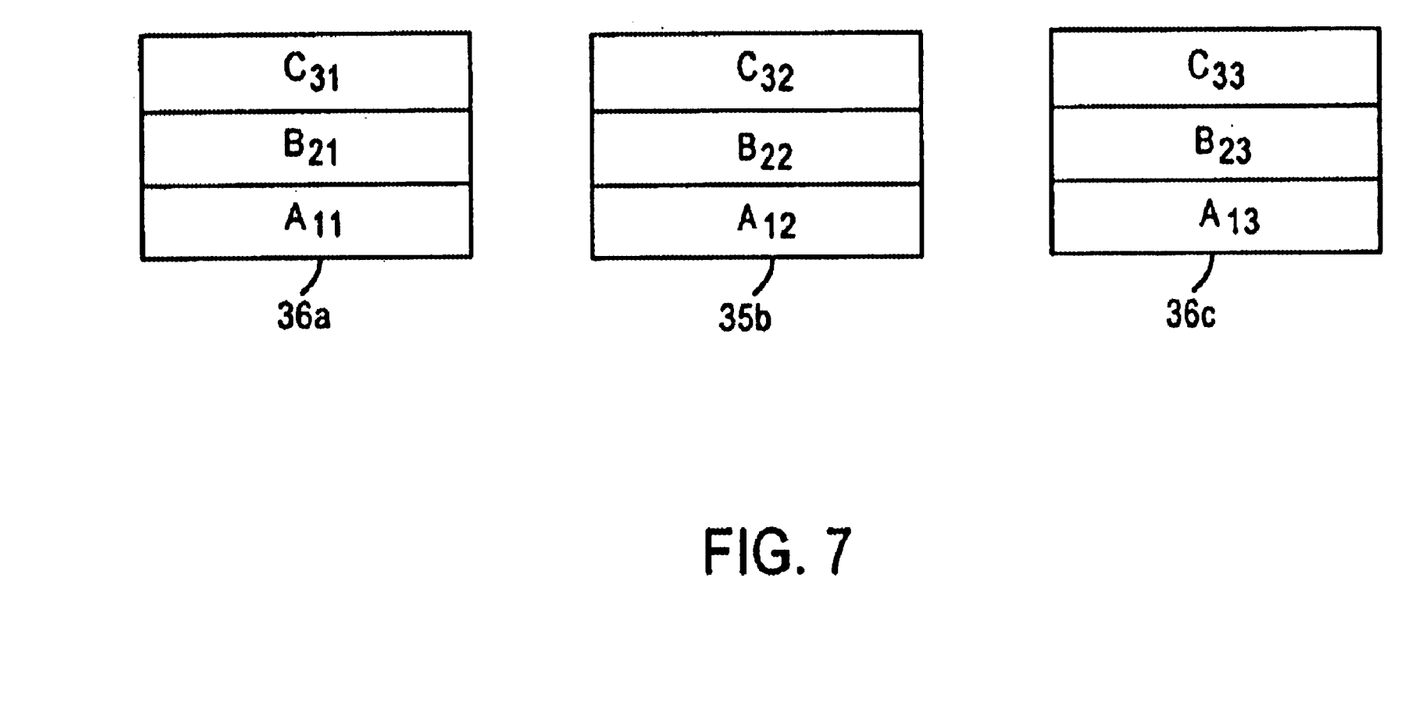
FIG. 7 is a diagram illustrating the storage of data segments in different buffers according to the protocol of FIG. 6.

The same prescribed number of successive reads or writes occurs in the embodiment of FIGS. 5 and 6 to optimize the bandwidth of the data buses 45 and 47. As shown in FIG. 5, the elasticity buffers 74 are configured for storing the data units until a sufficient number of data units for a selected data frame are received for transfer via the three data buses 47a, 47b and 47c to the shared local memory buffers 36a, 36b and 36c, respectively. Hence, the first three data units for data packets A, B and C, are written at time intervals 3, 4 and 5, respectively. FIG. 7 illustrates the storage of the data segments after time interval 5 in the different local memory buffers 36. As described above, the controller interfaces 70 will write packet data for a successive prescribed number of access cycles to minimize the occurrence of turnaround cycles between read and write cycles. As shown in FIG. 6, the controller interfaces 70 read data units of a data frame D from respective local buffer memories 36 in time interval 7 and stores the retrieved data units frame data in one of the elasticity buffers 74, enabling at least one of the switch modules 12 to receive the frame data via the corresponding data bus 45 over the next three access cycles. FIG. 7 illustrates, as an example, switch module 12 a receiving frame data for frame D via controller 50a.

According to the disclosed embodiment, memory bandwidth is optimized by distributed storage of packet data across memory devices. The memory interfaces 44 also may share frame pointer data, etc. via the address buses (i.e., "ad") shown in FIG. 4 enabling the memory interfaces 44 of each of the different switch modules 12 to identify the location of each of the data packets received by other switch modules.

Hence, any one of the switch modules 12 may obtain the frame data in an efficient manner, even if the frame data needs to be transferred to anther switch module that did not originally receive the data packet via a network port.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A switching system comprising:
   a plurality of multiport switch modules, each having a memory interface configured for outputting frame data of a corresponding received data frame as data units onto a corresponding first data bus;
   a plurality of local memory controllers, each local memory controller connected to a corresponding multiport switch module via the corresponding first data bus and configured for routing data units over one of a second data bus connecting the local memory controller and a corresponding third data bus; and
   a plurality of buffer memories, each coupled to a corresponding one of the local memory controllers by the corresponding third data bus and configured for storing a different, respective data unit from each of the data frames from the multiport switch modules, each of the local memory controllers supplying a different, respective data unit of the corresponding received data frame to the plurality of buffer memories according to a prescribed access protocol.

2. The system of claim 1, wherein each memory interface comprises a scheduler for controlling writing and reading of the data units between the plurality of local memory controllers according to the prescribed access protocol.

3. The system of claim 1, wherein each local memory controller comprises a controller interface for supplying selected data units of the corresponding received data frame to another one of the local memory controller, for storage in a corresponding another one of the memories according to the prescribed access protocol.

4. The system of claim 3, wherein each controller interface accesses the corresponding memory for transfer of a corresponding data unit of a selected one of the received data frames.

5. The system of claim 1, wherein the local memory controllers transfer, between the respective buffer memories, unique ones of the data units for the received data frames each memory access cycle.

6. The system of claim 5, wherein each local memory controller has a prescribed sequence position according to the prescribed access protocol, wherein the data units of a corresponding data frame are successively written into the respective buffer memories according to the prescribed sequence.

7. The system of claim 1, wherein each local memory controller further comprises a plurality of elasticity buffers configured for temporarily storing the data units in the during transfer of the data units between the multiport switch modules and the buffer memories.

8. The system of claim 1, wherein each local memory controller further comprises a plurality of elasticity buffers configured for temporarily storing the data units in the during transfer of the data units between the local memory controller and the buffer memories.

9. The system of claim 8, wherein each local memory controller successively supplies the data units of the received data frames to the buffer memories after a first prescribed number of memory access cycles, each local memory controller successively reading data units of data frames stored in the buffer memories for a second prescribed number of memory access cycles.

10. A method for temporarily storing a data frame received from a network node, the method comprising:
    receiving the data frame via a first of a plurality of switches, each of the switches having a memory interface configured for transferring a data frame between the switch and a corresponding local memory controller, each corresponding local memory controller, in turn, connected to a corresponding local memory controller;

outputting only a first portion of the data frame to a first corresponding local buffer memory from a first corresponding local memory controller, transferring at least a second portion of the data frame to at least one other of the plurality of local memory controllers from the first corresponding local memory controller; and outputting only the second portion by the at least one other local memory controller to a second corresponding memory.

11. The method of claim 10, further comprising successively outputting, by the local memory controllers, respective portions of received data frames to the respective memories for a prescribed number of memory access cycles according to a prescribed access protocol between the local memory controllers.

12. The method of claim 10, further comprising transferring the portions of the received data frames between the local memory controllers for transfer between non-corresponding memories and switches.

* * * * *